US009094837B2

(12) United States Patent
Chandra et al.

(10) Patent No.: US 9,094,837 B2
(45) Date of Patent: Jul. 28, 2015

(54) TRANSMITTING DATA IN A WIRELESS WHITE SPACE NETWORK

(75) Inventors: Ranveer Chandra, Kirkland, WA (US); Thomas Moscibroda, Redmond, WA (US); Xiaohui Wang, Pittsburgth, PA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 740 days.

(21) Appl. No.: 12/796,683

(22) Filed: Jun. 9, 2010

(65) Prior Publication Data

US 2011/0306375 A1    Dec. 15, 2011

(51) Int. Cl.
*H04B 15/00*        (2006.01)
*H04W 24/00*        (2009.01)
*H04W 72/00*        (2009.01)

(52) U.S. Cl.
CPC .............. *H04W 24/00* (2013.01); *H04W 72/00* (2013.01)

(58) Field of Classification Search
CPC . H04W 88/08; H04W 72/044; H04W 72/042; H04W 72/02; H04W 72/085; H04B 17/0077
USPC ........ 455/509, 114.2, 62, 501, 63.1; 370/468, 370/329, 312, 338, 235, 330, 252
See application file for complete search history.

(56) References Cited

U.S. PATENT DOCUMENTS 8,107,391 B2 * 1/2012 Wu et al. ........................ 370/252
2006/0009232 A1 * 1/2006 Vakil et al. ..................... 455/453

(Continued)

FOREIGN PATENT DOCUMENTS

JP    2006108799 A    4/2006
JP    2007300421 A    11/2007

(Continued)

OTHER PUBLICATIONS

Cooperative Relay for Cognitive Radio Networks, by Juncheng Jia. Date 2009.*

(Continued)

*Primary Examiner* — Wesley Kim
*Assistant Examiner* — Md Talukder
(74) *Attorney, Agent, or Firm* — Ladislav Kusnyer; Harri Valio; Micky Minhas

(57) ABSTRACT

There is provided a computer-implemented method for transmitting data over a wireless network using white spaces. A first white space transmission channel is determined for communicating with mobile client devices. Wireless communication takes place with the mobile client devices over the first white space transmission channel. If the first white space transmission channel becomes unavailable to one of the mobile client devices because of the presence of a primary user on the first white space transmission channel, a different white space transmission channel is determined for communicating with the mobile client device that is affected. The first white space transmission channel may become unavailable to the affected mobile client device, for example, because a primary user begins using the first white space transmission channel in proximity to the affected device. The primary user may be a wireless microphone. Thereafter, communication with the affected wireless device takes place on the different white space transmission channel, while unaffected devices continue to communicate on the first white space transmission channel. Also provided are an exemplary wireless base station and an exemplary mobile client device.

19 Claims, 4 Drawing Sheets

(56) References Cited

U.S. PATENT DOCUMENTS

| | | | |
|---|---|---|---|
| 2008/0013571 A1* | 1/2008 | Yen | 370/468 |
| 2008/0130519 A1 | 6/2008 | Bahl et al. | |
| 2008/0171552 A1* | 7/2008 | Hyon et al. | 455/450 |
| 2009/0059805 A1* | 3/2009 | Choi et al. | 370/252 |
| 2009/0067354 A1* | 3/2009 | Gao et al. | 370/310 |
| 2009/0196180 A1* | 8/2009 | Bahl et al. | 370/235 |
| 2009/0221286 A1 | 9/2009 | Kim et al. | |
| 2009/0252102 A1 | 10/2009 | Seidel et al. | |
| 2009/0268674 A1* | 10/2009 | Liu et al. | 370/329 |
| 2009/0323600 A1* | 12/2009 | Chandra et al. | 370/329 |
| 2010/0135226 A1* | 6/2010 | Chandramouli et al. | 370/329 |
| 2010/0184435 A1* | 7/2010 | Shellhammer et al. | 455/436 |
| 2010/0197317 A1* | 8/2010 | Sadek et al. | 455/452.2 |
| 2010/0309806 A1* | 12/2010 | Wu et al. | 370/252 |
| 2010/0323715 A1* | 12/2010 | Winters | 455/456.1 |
| 2011/0044392 A1* | 2/2011 | Maltsev et al. | 375/260 |
| 2011/0069655 A1* | 3/2011 | Ikeda | 370/315 |
| 2011/0182257 A1* | 7/2011 | Raveendran et al. | 370/329 |
| 2011/0306375 A1* | 12/2011 | Chandra et al. | 455/509 |

FOREIGN PATENT DOCUMENTS

| | | |
|---|---|---|
| JP | 2010068277 A | 3/2010 |
| JP | 2010098392 A | 4/2010 |
| JP | 2011507324 A | 3/2011 |
| WO | WO2009/072087 A1 | 6/2009 |
| WO | 2009084463 A1 | 7/2009 |

OTHER PUBLICATIONS

Cooperative Relay for Cognitive Radio Network. By Jia. 2009.*
PCT International Search Report, mailed Dec. 12, 2011, English.
Navda, Vishnu., "Cross-layer Design for Interference Mitigation and Mobility", Retrieved at << http://dspace.sunyconnect.suny.edu/bitstream/1951/44843/1/100621101.sbu.pdf >>, Dec. 2007, pp. 133.
Monrad-Hansen, Jens W., "Radio Planning and Coverage Prediction of Mobile WiMAX in Trondheim", Retrieved at << http://daim.idi.ntnu.no/masteroppgave?id=4662 >>, Jun. 2009, pp. 219.
Amanna, Ashwin., "Assessment of Current and Emerging Broadband Wireless Technologies for VDOT's Operations Program", Retrieved at << http://www.vtti.vt.edu/PDF/VIWC_PDFs/Assessment%20of%20Current%20and%20Emerging%20Broadband%20Wireless%20Technologies%20for%20VDOT%20Operations.pdf >>, Jun. 30, 2008, pp. 111.
Jia, et al., "Cooperative Relay for Cognitive Radio Networks", Retrieved at << http://ieeexplore.ieee.org/stamp/stamp.jsp?tp=&arnumber=5062156 >>, The 28th Conference on Computer Communications, IEEE In INFOCOM, 2009, pp. 2304-2312.
Perez, Sarah., "Microsoft Researchers Develop "White-Fi" Technology", Retrieved at << http://on10.net/blogs/sarahintampa/Microsoft-Researchers-Develop-White-Fi-Technology/ >>, Aug. 26, 2009, p. 1.
Mody, et al., "IEEE 802.22 Working Group on WRANs", Retrieved at <<http://wwwieee802.org/22/ >>, Retrieved Date: Apr. 6, 2010, p. 1.
Stephens, Adrian., "The 802.11 Wireless Local Area Networks", Retrieved at << http://www.ieee802.org/11 >>, Retrieved Date: Apr. 6, 2010, pp. 2.
Shellhammer, Steve., "The 802.19 Wireless Coexistence Working Group", Retrieved at << http://www.ieee802.org/19 >>, Retrieved Date: Apr. 6, 2010, pp. 2.
"The CogNeA Alliance", Retrieved at << http://www.cognea.org/v01/ >>, Retrieved Date: Apr. 6, 2010, p. 1.
Jones, et al., "Evaluation of the Performance of Prototype TV-Band White Space Devices", Retrieved at << http://www.signallake.com/innovation/DA-08-2243A3.pdf >>, OET Report, FCC/OET 08-TR-1005, Oct. 15, 2008, pp. 149.
Bahl, et al., "White Space Networking with Wi-Fi like Connectivity", Retrieved at << http://www.eecs.harvard.edu/~mdw/papers/whitefisigcomm09.pdf >>, Proceedings of the ACM SIGCOMM 2008 Conference on Applications, Technologies, Architectures, and Protocols for Computer Communications, Aug. 16-21, 2009, pp. 12.
Deb, et al., "Dynamic Spectrum Access in DTV Whitespaces: Design Rules, Architecture and Algorithms", Retrieved at << http://delivery.acm.org/10.1145/1620000/1614322/p1-deb.pdf?key1=1614322&key2=4521550721&coll=GUIDE&dl=GUIDE&CFID=83077958&CFTOKEN=17554230 >>, International Conference on Mobile Computing and Networking, Proceedings of the 15th annual international conference on Mobile computing and networking, Sep. 20-25, 2009, pp. 1-12.
Degesys, et al., "DESYNC: Self-Organizing Desynchronization and TDMA on Wireless Sensor Networks", Retrieved at << http://www.eecs.harvard.edu/~ianrose/pubs/desync-ipsn07.pdf >>, Information Processing in Sensor Networks, Proceedings of the 6th international conference on Information processing in sensor networks, Apr. 25-27, 2007, pp. 10.
Kim, et al., "Fast Discovery of Spectrum Opportunities in Cognitive Radio Networks", Retrieved at << http://ieeexplore.ieee.org/stamp/stamp.jsp?tp=&arnumber=4658241 >>, In Proceedings of the 3rd IEEE Symposia on New Frontiers in Dynamic Spectrum Access Networks (IEEE DySPAN), Oct. 2008, pp. 1-12.
Kim, et al., "In-band Spectrum Sensing in Cognitive Radio Networks: Energy Detection or Feature Detection?", Retrieved at << http://delivery.acm.org/10.1145/1410000/1409948/p14-kim.pdf?key1=1409948&key2=9631550721&coll=GUIDE&dl=GUIDE&CFID=83078104&CFTOKEN=55336822 >>, International Conference on Mobile Computing and Networking, Proceedings of the 14th ACM international conference on Mobile computing and networking, Sep. 14-19, 2008, pp. 14-25.
Rahul, et al., "Frequency-Aware Rate Adaptation and MAC Protocols", Retrieved at << http://people.csail.mit.edu/rahul/papers/faramobicom2009.pdf >>, Proceedings of the 15th annual international conference on Mobile computing and networking, Sep. 20-25, 2009, pp. 12.
Shu, et al., "Throughput-efficient sequential channel sensing and probing in cognitive radio networks under sensing errors", Retrieved at << http://delivery.acm.org/10.1145/1620000/1614325/p37-shu.pdf?key1=1614325&key2=6241550721&coll=GUIDE&dl=GUIDE&CFID=83078230&CFTOKEN=87877055 >>, International Conference on Mobile Computing and Networking, Proceedings of the 15th annual international conference on Mobile computing and networking, Sep. 20-25, 2009, pp. 37-48.
"Improving Access to High Speed Broadband in Claudville, Virginia With TV White Spaces", Retrieved at <<http://spectrumbridge.com/web/images/pdfs/whitespaces_casestudy-spectrumbridge.pdf >>, pp. 2.
Yuan, et al., "Knows: Kognitiv Networking Over White Spaces", Retrieved at << http://www.google.co.in/url?sa=t&source=web&ct=res&cd=1&ved=0CAYQFjAA&url=http%3A%2F%2Fciteseerx.ist.psu.edu%2Fviewdoc%2Fdownload%3Fdoi%3D10.1.1.123.4056%26rep%3Drep1%26typ%3Dpdf&rct=j&q=%22Kognitiv+Networking+Over+White+Spaces%22&ei=9-e6S4jJOpf00gTbypH7Bg&usg=AFQjCNHu6tyqKmam6SQOmwmLoUdhssJGvw >>, IEEE Dynamic Spectrum Access Networks (DySPAN), Apr. 2007, pp. 12.
"Office Action Received for Japanese Patent Application No. 2013-514191", Mailed Date: Dec. 16, 2014, 9 pages.
"First Office Action and Search Report Received for Chinese Patent Application No. 201180028283.5", Mailed Date: Aug. 5, 2014, 12 Pages.
"Second Office Action Issued in Chinese Patent Application No. 201180028283.5", Mailed Date: Mar. 24, 2015, 8 pages.

* cited by examiner

TRANSMITTING DATA IN A WIRELESS WHITE SPACE NETWORK

BACKGROUND

In 2008, a ruling by the Federal Communications Commission (FCC) paved the way for commercial wireless networking products to operate over white spaces. White spaces are the vacant channels in the VHF and UHF frequency spectra. Unlike the frequency spectra available for mature wireless networking protocols (for example, Wi-Fi networking), the spectrum available for white space networks is well-suited to covering a relatively large area. For example, a white space network could be employed in a corporate or university campus setting to allow a large number of users to access a common network across several buildings over an area of a few hundred square feet to one or more square miles.

The FCC ruling that authorized the creation of white space wireless devices also established some rules that could make the implementation of white space networks in urban campus environments more difficult. For example, a requirement of the FCC ruling is for new white space wireless devices to avoid interference with primary users or incumbent devices. Primary users and incumbent devices include TV transmitters and wireless microphones. Moreover, new white space devices are not allowed to transmit on channels that are being used by primary users (which, for example, in the UHF TV bands are television stations and licensed wireless microphones), even if the primary user begins broadcasting after the white space device.

In many existing wireless communication protocols (such as the Wi-Fi protocol), a base station and all connected client devices must be on the same channel in order to allow for the protocol to work correctly. If white space network devices followed the same strategy (i.e., all client-devices connected to the same base station must be on the same channel), a wireless base station that is communicating with a number of wireless clients would need to disconnect from all connected client devices or change channels to an available channel if a primary user such as a wireless microphone is identified on the channel being used by the wireless base station. This rule would have a significant detrimental impact on the throughput of white space networks. Moreover, even if only one of the associated clients sees the channel as becoming unavailable, then either this client would become disconnected, or alternatively, the base station and all other associated clients would need to switch to a new channel that is available at all clients as well as the base station. This is problematic because there may not be such a channel that is available on all associated client devices as well as at the base station. Even if such a commonly available channel exists, having all clients and the base station switch whenever the channel becomes unavailable at a single client could incur significant overhead. In urban environments, it is likely that such a scenario (i.e., only one or few clients sees a channel as unavailable) occurs frequently due to the presence of wireless microphones.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to wireless communication over white space networks. In an exemplary method, a first white space transmission channel is determined for communicating with mobile client devices. Wireless communication takes place with the mobile client devices over the first white space transmission channel. If the first white space transmission channel becomes unavailable to one of the mobile client devices because of the presence of a primary user on the first white space transmission channel, a different white space transmission channel is determined for communicating with the mobile client device that is affected. The first white space transmission channel may become unavailable to the affected mobile client device if, for example, a primary user begins using the first white space transmission channel in proximity to the affected client device or if the client device moves into range of an active primary user. The primary user may be a wireless microphone or a TV station. Thereafter, communication with the affected mobile client device takes place on the different white space transmission channel, while unaffected client devices continue to communicate on the first white space transmission channel.

A wireless base station according to the subject innovation communicates with wireless clients on different channels, depending on the spectrum that is available to the various mobile client devices. For example, if a first white space communication channel is available to one or more mobile client devices, then those client devices may communicate with the wireless base station on the first white space communication channel. The wireless base station may communicate with other mobile client devices on a second white space communication channel if the first white space communication channel is not available to the other mobile client devices. For example, the other mobile client devices may be prohibited from using the first white space communication channel by the local presence of a primary user that is communicating on the first white space communication channel. Exemplary embodiments of the subject innovation address local spectrum asymmetry situations in white space networks.

A mobile client device according to the subject innovation transmits and receives data over white spaces. The mobile client device communicates with a wireless base station over a first white space communication channel when the first white space communication channel is not being used by a primary user. Communication with the wireless base station takes place over a second white space communication channel when the first white space communication channel is being used by a primary user.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
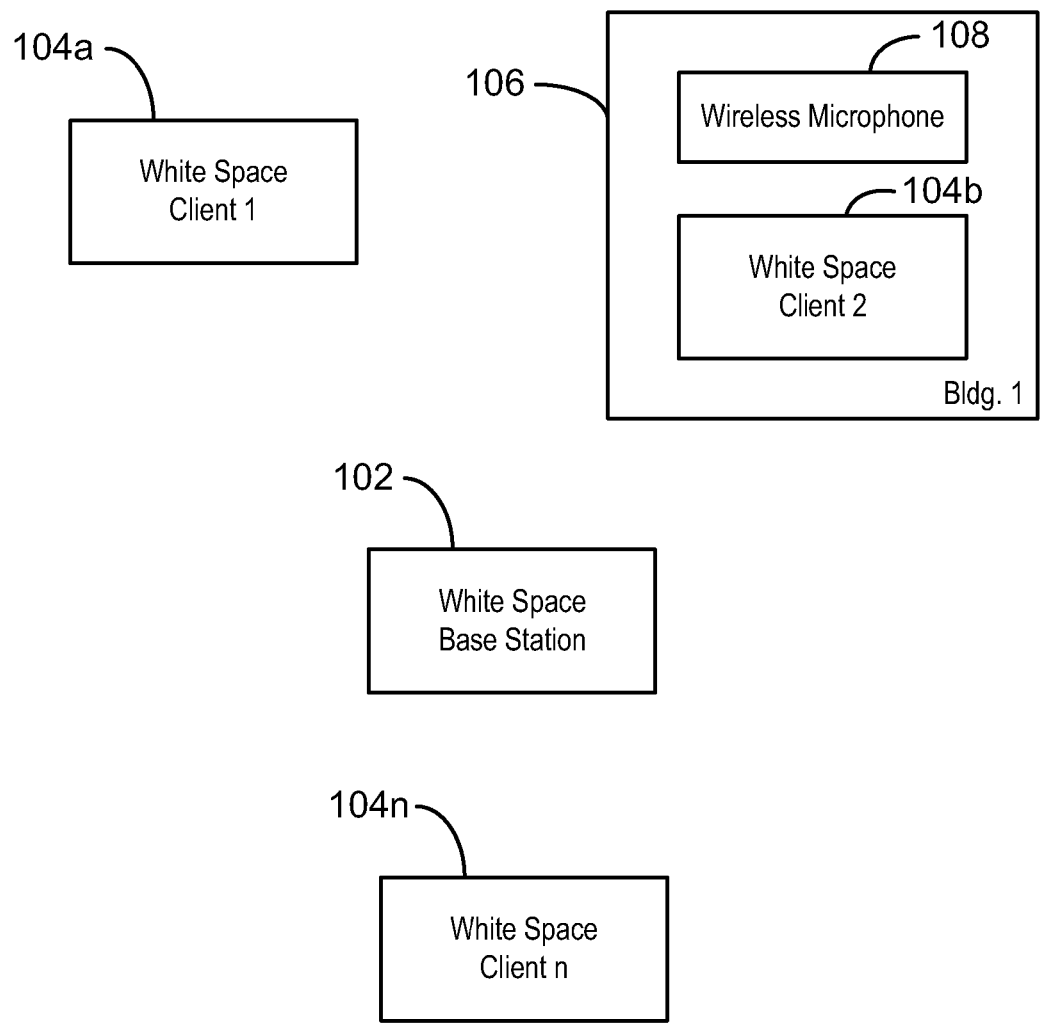
FIG. 1 is a block diagram of a wireless white space network that may be operated in accordance with the subject innovation.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "wireless base station," "wireless client," "white space network," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media. Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The subject innovation addresses issues that arise when engaging in wireless communication over a white space network. In particular, a wireless client may desire to engage in communication with a wireless base station that is already engaged with other wireless clients on a white space communication channel that is not available to the wireless client. To address this situation, an exemplary embodiment of the subject innovation may provide protocols that allow the base station to serve multiple clients simultaneously on different parts on the spectrum, taking into account the respective client's available white space spectrum. An exemplary embodiment of the subject innovation may be configured to achieve near-optimal throughput, while also minimizing switching overhead. This switching overhead occurs at the base station whenever it switches from one channel (service the clients on that channel), to another channel.

An exemplary embodiment of the subject innovation may reduce switching overhead in white space networks, as well. Algorithms for determining the order in which a base station transmits to the clients in its downlink slot and/or the order in which the clients transmit to the base station in their uplink slots are specifically described herein. In addition to deciding the order of transmission, a portion of the spectrum (i.e., a channel) on which each client transmits and/or receives is also decided with a goal of optimizing network throughput. Moreover, the subject innovation may provide increased overall network throughput and capacity in urban white space networks. The subject innovation may provide a way of coordination between multiple overlapping (and thus potentially interfering) access points in the same white space network.

Following the FCC ruling in 2008, a tremendous amount of excitement has occurred relating to networking over the TV white spaces. The ruling, which allows unlicensed devices to operate in the unoccupied TV bands, has opened up several new networking opportunities from rural broadband connectivity to faster, reliable connections within the home. Several technology companies, including silicon vendors, hardware manufacturers and software companies, are attempting to capitalize on this opportunity by developing technologies to efficiently use this portion of the spectrum.

The use of TV white spaces may provide advantages relative to other frequency spectra. First, it makes a lot more spectrum available for wireless networking. Depending on the region, up to 300 MHz might be available. Second, these white spaces are in the lower frequencies, which have very good propagation characteristics. This is the first time that unlicensed devices have been given an opportunity to operate in such low frequencies at large bandwidths and a reasonably high transmit power. This combination of low frequencies and more spectrum provides an opportunity to build new services and enable networking scenarios that were not possible earlier, either due to technical or economic reasons.

Exemplary embodiments of the subject innovation relate to a scenario of providing network connectivity in all outdoor areas of a large university or industrial campus. Wi-Fi has not proven to be very effective in this scenario because of its limited range and tendency to be extremely lossy. Even deploying three to four Wi-Fi access points on the rooftop of every two-storeyed campus building still resulted in several coverage holes in the network. An alternative proposal is to use cellular technologies to provide Internet connectivity in campus shuttles. Such an approach is expensive and offers low bandwidth. Furthermore, use of cellular technology means that client devices are no longer directly connected to the corporate network, which introduces additional overhead, thus reducing performance. In contrast, white spaces provide a cheaper alternative for offering more bandwidth to students and employees in all parts of a campus, while maintaining direct control of network resources by the university or employer's IT department.

However, building a campus wide white space network poses several challenges. First, the coverage provided by white space networks at the approved transmit power levels is unknown. As shown herein, using existing propagation models can lead to significant overestimates at such low transmit power values. Second, the number of channels available to build white space networks, given the FCC mandated sensing threshold of −114 dBm for wireless microphones is relatively low. It seems theoretically possible that a single wireless microphone can potentially block an entire campus from using a particular white space communication channel. Finally, if only a few channels are commonly available across the campus, system throughput using existing white space protocols is likely to be very low.

As explained herein, exemplary embodiments of the subject innovation have been deployed and the results measured in a corporate campus environment. This deployment comprised radios that were capable of operating in UHF and VHF frequency spectra, and employed transmit power levels approved by the FCC. Results obtained indicated that two base stations are sufficient to cover all regions in a one square mile campus. It has also been shown that the impact of wireless microphones is local.

Because of the existence of incumbent wireless microphones, base stations and clients in white space networks may have different portions of frequency available for transmission. The phenomenon of wireless clients having different portions of the frequency spectrum available for transmission relative to base stations in a white space network is referred to herein as local spectrum asymmetry (LSA). Moreover, the occurrence of LSA situations in a campus environment has been discovered to be relatively common because of the presence of wireless microphones. As explained herein, networking protocols that propose the use of a channel that is commonly available at the base station and clients perform very poorly in such settings. Exemplary embodiments of the subject innovation relate to an algorithm, referred to herein as a "client allocation algorithm," that clusters clients across different channels in a way that improves the system capacity. In computer science jargon, the client allocation algorithm according to the subject innovation may be referred to as a "greedy" algorithm because it systematically allocates clients in an iterative fashion, making decisions regarding which channel a client should be assigned to at a given iteration. Greedy algorithms are not necessarily optimal in the final output, because the allocation takes place with respect to current conditions in a given iteration. Nonetheless, greedy algorithms are typically close to approximating optimal solutions. The performance of an exemplary client allocation algorithm is explained herein in the context of detailed simulations and evaluations of an actual implementation. The exemplary implementation includes a base station mounted on the roof of a building in a corporate campus setting. A shuttle bus was equipped to incorporate a wireless client configured to operate over available white spaces using the IEEE 802.16d WiMax protocol. Moreover, exemplary embodiments of a white space network are explained with reference to FIG. 1.

FIG. 1 is a block diagram of a wireless white space network 100 that may be operated in accordance with the subject innovation. The white space network 100 includes a base station 102 and a plurality of mobile client devices 104a, 104b, 104n. The base station 102 may be configured to communicate wirelessly with the mobile client devices 104a, 104b, 104n over the white space frequency spectrum.

A potential for inefficiency in the operation of white space networks is the FCC regulation that white space devices are not allowed to interfere with primary users (both wireless microphones and TV transmissions). FCC regulations further mandate that primary users may be identified by either sensing or consulting a geo-location database. If primary users are detected by these methods, the portion of the white space frequency spectrum being used by the primary user devices is not to be used by a white space networking device. Consequently, two white space devices that wish to communicate with each other may not have the same spectrum available. One of the two nodes may be able to use a certain channel, while the other cannot.

As it turns out, this phenomenon of spatial spectrum variation occurs very frequently, particularly in on-campus networks or urban environments, due to the existence of wireless microphones inside of buildings. Buildings tend to shield the microphone's transmission, thus significantly reducing the emission range of the microphone's transceiver to just the close proximity of the building. It is thus very likely that a client near a building containing an active microphone will not be allowed to use the same channel of the microphone channel because the microphone is considered to be a primary user. This is problematic when a base station to which a particular client is connected sees the given channel as being free (for example, because of its further location from the microphone), and all other clients (that may not be located close to the building) associated to this base station may also see this channel as being free. The inability of the base station to communicate with one or more wireless mobile client devices because of the presence of a primary user in close proximity to the wireless mobile client is an example of an LSA situation. Measurement results have shown that LSA conditions frequently occur in on-campus or urban environments. Thus LSA poses a challenge to urban white space network deployment.

A specific example of an LSA situation that the subject innovation is intended to address is shown in FIG. 1. Assume that the mobile client device 104b is located inside a building 106, as shown in FIG. 1. Also located in the building 106 is a wireless microphone 108, which is a primary user for purposes of this example. To illustrate an LSA condition, assume that the wireless microphone 108 is operating on the same channel as the base station 102. Because the channel being used by the wireless microphone 108 is the same as the base station 102, the mobile client device 104b is not allowed to communicate with the base station 102 on that channel. The base station 102 is able to communicate with the mobile client device 104a and the mobile client device 104n on the same channel used by the wireless microphone 108 because the base station 102 may be out of range of the wireless microphone 108. Moreover, the transmission range of the wireless microphone 108 may be substantially limited to the interior of the building 106 and the immediately surrounding area.

Two potential solutions to the LSA situation illustrated in FIG. 1 are to force all mobile client devices to disconnect from the base station or to force the base station 102 and the mobile client devices 104a and 104n to switch to a channel that is also available to the mobile client device 104b. These solutions may, however, be very undesirable when considering overhead associated with network switching, spectrum utilization and/or network capacity/throughput, to name just a few examples. It may also be undesirable to operate the white space network 100 using a control channel-based approach (such as CMAC).

As explained herein, an exemplary embodiment of the subject innovation provides that the base station 102 may communicate with the mobile client devices 104a, 104n on a first white space communication channel and with the mobile client device 104b on a second white space communication channel. In this manner, the base station 102 is relieved of the inefficiency of disconnecting from the mobile client devices 104a, 104n and re-establishing communication with them on a different white space communication channel that is also available to the mobile client device 104b.

Campus-Wide Network Coverage. Exemplary embodiments of the subject innovation relate to providing wireless network coverage in large-scale campuses (corporate campuses, universities, hospitals, etc.). There are several common characteristics of such campuses that are relevant to the design of such a network. First, existing dense Wi-Fi deployments typically already provide good coverage inside of buildings. On the other hand, coverage is typically bad or even non-existent outside of buildings. Second, these campuses are characterized by mobility. While most network access will occur within buildings or close to buildings, people occasionally move between buildings, either by car or on foot. For example, in an existing campus environment used to conduct experiments in white space network deployment described herein, there are a large number of shuttle busses that bring employees from one building to another within the campus.

With Wi-Fi networking, providing complete, uninterrupted network coverage within the campus is challenging. For example, in an enterprise campus environment, it is not typically possible for internal VoIP calls can be maintained uninterruptedly as the callers leave buildings, move between them, or ride shuttles on campus. An exemplary embodiment of the subject innovation relates to quantifying outdoor coverage holes in a campus environment having an existing indoor Wi-Fi deployment. As explained herein, a network over white spaces can be used to provide network connectivity in regions that currently lack good network coverage.

Coverage over White Spaces. Because of their relatively lower frequencies relative to mature networking protocols, it is expected that the UHF and VHF spectrum bands will provide improved signal propagation properties than Wi-Fi's ISM bands. For example, for the same transmission power, the Friis formula predicts four times the range at 600 MHz over 2.4 Ghz Wi-Fi. A question of interest is whether this theoretically predicted range does really translate into a corresponding increase in network coverage when used in a campus-like environment with obstacles, buildings, etc.

Experimental data has been obtained representing raw received power at a mobile shuttle (for example, the mobile client device 104n) at different distances from the base station 102. In one such experiment, the noise floor of a receiving radio was −105 dBm when transmitting over 1.75 MHz of the spectrum. In this situation, both the UHF and VHF spectra were demonstrated to provide excellent propagation characteristics.

In an exemplary system, measurements have been taken showing the variation of received signal strength with the distance from the base station 102. According to the resulting data, the signal is weaker on average when increasing the distance. However, significant variation was observed in the received power for the same distance. This variation may be attributable to the number of obstructions in the path. For example, the mobile shuttle was observed to receive a 10 dB stronger signal at a building on the other side of a freeway, in comparison to a location near another building at a similar distance from the base station on the same side as the freeway. Second, VHF signals were observed to be much less affected by obstructions. VHF signals were further observed to have a much smoother fall off then UHF signals. In fact, the propagation was observed to be greater than predicted by the Friis formula. According to the formula, signals at 518 MHz experience approximately 10 dB more attenuation than 177 MHz (VHF). Although similar attenuation was observed at shorter distances, the attenuation is significantly more on increasing the distance. Finally, it is noted that UHF frequencies can propagate more than 700 meters before hitting the noise floor of an exemplary measurement system of −105 dBm. Therefore, the propagation characteristics of the white space frequencies seem promising in providing network coverage in large campuses.

Impact of Wireless Microphones. A typical campus environment is likely to have several wireless microphones. There are lectures in buildings, sometimes more than one, and campuses usually host several other events as well. Since FCC restrictions do not permit white space devices to operate on TV channels that are in use by wireless microphones, it would seem that a large number of white space communication channels would be rendered unusable by them. The effects of wireless microphones on white space networking operation is examined herein. Moreover, the popularity of microphones on a known campus is considered, as well as the channels they use. The region that is blocked by a microphone in operation is considered, and consideration is given to factors that influence the size of the blocked region.

Microphones in a Campus Setting. In an urban campus setting, wireless microphones operate in virtually every channel of the available TV frequency spectrum. Experiments have been conducted with respect to microphone usage in two different buildings in an existing campus—a department building and a conference center. The regular department building was observed to have wireless microphones in eight different locations within the building. Per location, there were three, four, or eight (large conference rooms) wireless microphones, respectively, for a total of 32 microphones in the department building. Each microphone could be tuned to operate in a different microphone channel, and collectively, the 32 microphones were observed to operate in 12 different TV channels. The conference building was observed to have 80 wireless microphones for regular use, all on different microphone channels, which were distributed across 16 TV channels. Typically, not all microphones are in use at the same time. Even for the same location, the microphone operators usually decide on which microphones to use for an event depending on remaining battery lifetime.

Region Blocked by Microphones. It is commonly believed that a single wireless microphone can potentially block off a complete TV-channel with respect to white space network access within a large area. For example, a simple free-space path-loss model predicts (even for a path-loss exponent as high as $\alpha=4$) that a microphone transmitting at 14 dBm would block off the channel within an area of roughly 2.5 kilometers range round the microphone, at the FCC-mandated sensing threshold of −114 dBm. Even a more conservative propagation model, such as the Egli model, predicts the channel to be blocked within a range of 1.3 kilometers. Hence, theoretical models predict that even a single wireless microphone located near the center of a known campus, could essentially block off an entire TV channel, rendering it unusable for white space network access throughout the campus.

If, indeed, a single wireless microphone blocked off white space network access for an entire TV channel on campus, this would cause a significant problem in system capacity, because in areas with many wireless microphones, there would remain only very few available TV channels. Fortunately, this is not the case. The reason is that wireless microphones are typically used indoors, for example, in conference rooms. Experimental measurements have shown that signal emissions from microphones within conference rooms are significantly shielded from the outside, such that the remaining signal strength that leaks outside the buildings is low.

Experimental data with respect to the leakage of wireless microphone signals outside of buildings has been obtained. In so doing, a 4 W transmitter at 518 MHz was placed inside two buildings, and received signal strength around a shuttle route was measured. This experimental data shows that the region in which white space access is blocked by a wireless microphone inside a building is relatively small. Moreover, the blocked region may comprise only a small fraction of area compared to the entire coverage of the base station (i.e., locations from where the mobile client could successfully ping the base station when operating under the FCC power limitation rules restricting the client to transmit at 100 mW and the base station to transmit at 4 W. According to one estimation, the wireless microphone was determined to mostly block off less than 300 meters around it.

Outdoor Leakage from an Indoor Microphone. Experimental observation indicates that the signal from a wireless microphone inside a building is sufficiently attenuated by the building to cause the channel to be blocked off for white space use only within the near vicinity of the building. The strong attenuation observed experimentally is not accidental, but is believed to be a feature of many campuses and to urban areas in general. A contributing factor is that modern buildings use so-called low emissive (Low-E) windows and doors to prevent heat from passing through windows in order to save energy. Windows achieve Low-E typically with a metallic coating which reflects the long-wave rays that bring heat and UV.

In the context of white space networking, it is noted that Low-E coated windows significantly add to the attenuation of the signals emitted by a wireless microphone. Those of ordinary skill in the art will note, however, that different buildings can behave totally differently with regard to shielding and attenuation, which makes it difficult to predictably model the impact of a wireless microphone in a given scenario without performing actual measurements. In reality, the attenuation of different buildings and windows can vary widely.

Further experimentation has been performed to quantify the effect of attenuation caused by building doors on campus. The values differ dramatically depending on the construction of the doors and walls, and whether or not Low-E windows are used.

To quantify this effect, the attenuation of 30 building doors was measured on an existing campus and in apartment homes, including various kinds of (double and single door) front doors and side doors. Specifically, a wireless microphone operating in the UHF TV bands was placed inside the building. Using a spectrum analyzer, which is placed outside the building, the channel power of the microphone both with doors open and closed was measured. The results are that some doors provide as little as 4 or 5 dBm attenuation, whereas others have as much as 25 dBm. Furthermore, almost every value in between these two extremes was observed.

These results imply that while the specific attenuation faced by an indoor microphone signal can vary dramatically depending on the precise location and building structure, the attenuation caused by the building is typically high. Hence, it may be concluded that the amount of white spaces lost due to wireless microphones even on a busy campus with numerous conference rooms is relatively small. On the other hand, microphones do contribute to LSA problems that could impact the design of a white space network in a campus or urban setting.

Local Spectrum Asymmetry. As explained herein, white space networks have the limitation that devices are not allowed to use certain parts of the spectrum due to the presence of primary users. Consequently, two white space devices that wish to communicate may not have the same spectrum available. This white-space specific phenomenon has been called spatial spectrum variation, and is referred to as LSA herein. Experimental data indicates that LSA occurs commonly, and within the same network in campus and urban environments. Moreover, LSA has an effect that two white-space devices that are connected to each other (e.g., the base station 102 and the mobile client device 104b), do not see the same spectrum availability map.

LSA is likely to degrade the performance of white space systems operating under existing protocols such as Wi-Fi, White-Fi, IEEE 802.22, or CogNeA, that operate on single channel that is commonly available at the base station and all its clients. In such protocols, as soon as even a single client faces an LSA situation, the base station and all other associated clients move to another channel, assuming another channel is even available. A mobile client (for example, on a shuttle bus) could frequently pass by many microphones causing many channel switches.

Impact of LSA. White space networking protocols in which the base station and all mobile client devices communicate on a single channel are referred to as "all-on-one-channel" protocols, which is abbreviated as "AOOC protocols" herein. Using a simple mathematical model, it is shown herein that any such AOOC protocol induces a significant, inherent performance loss because it wastes a significant amount of available white spaces. The following discussion relates to the impact of LSA on various system metrics using a simple theoretical model.

In the following discussion of an LSA model, assume that there are n base stations, each having m clients. Further, assume that are C available channels (prior to detection of wireless microphones). On each channel, assume that there is a microphone with probability q, and that a microphone prevents a client from using this channel with probability p. (Collectively, q and p thus capture how likely mobile clients are to face an LSA situation).

Also described herein is a more complex model referred to as the LSA* model, which takes into account the geographic dependencies among various microphones. The LSA* model also contemplates a specific number of microphones, several of which can be on the same channel.

Impact on White Space Availability. LSA degrades the system capacity, and much more severely so for AOOC protocols. Let $E_A[S]$ and $E_O[S]$ be the expected number of white space channels S a client can use when using AOOC or an optimal protocol (abbreviated "OPT" herein), respectively. These values can be computed as $$E_A[S]=C[(1-q)+q(1-p)^m]$$

$$E_O[S]=C[(1-q)+q(1-p)].$$

Hence, while number of white space channels degrades linearly in p in an optimal protocol, AOOC protocols degrade much faster. For example, for $q \to \infty$, AOOC protocols make use only $(1-p)^m$ fraction of the totally available white space spectrum; and waste the rest. Notice that this is exponential in the number of clients per base station.

Impact on Load and Disconnections. As a result of "losing" white spaces, base stations in AOOC protocols tend to crowd into the few channels that are commonly available at all clients. This manifests itself in an increased load on these channels, and hence in increased interference. Specifically, define the load of a channel to be the number of clients that are expected to share this channel, and let $E_A[L]$ and $E_O[L]$ denote the expected load on a heavily loaded channel (one without a microphone). In the LSA model, these expressions can derived to be:

$$E_A[L] = \frac{nm}{E_A[S]}$$

$$E_O[L] = \frac{nm}{E_O[S]}.$$

Experimental data obtained for an LSA* model operating under an AOOC protocol (at 30 expected microphones) shows that as many as 30 clients (60% of the clients in the entire system) are crammed into one single channel. In contrast, an optimizing protocol improves the use of fragmented spectrum and achieves a load-balancing in which, on average, the most-loaded channel has at most 10 clients. Beyond 30 microphones, the load of AOOC reduces, which is because at this point, the number of disconnections starts increasing quickly. That is, more and more clients are unable to connect at all, which of course reduces the load. It may be concluded that AOOC protocols have significantly more interference caused by high load as well as disconnections that are needed.

Impact on Channel Widths. White-space spectrum is fragmented (because of the presence of primary users) and includes spectrum chunks of different size. Adjusting channel width on an adaptive basis is thus a useful tool for maximizing performance in these networks. In an LRA model, the likelihood that a client sees a specific channel consisting of X contiguous TV channels (assuming that the channels are available if not for microphones) is $(1-pq)^X$. However, in an AOOC protocol, the probability that this wide channel can actually be used is only $(1-pq)^{mX}$. Thus, AOOC protocols significantly reduce the effectively usable channel width of clients.

LSA with Mobility. An exemplary embodiment of the subject innovation endeavors to seamlessly provide connectivity to on-campus shuttles. In the case of such mobility, the consequences of the LSA problem becomes relatively disruptive. For example, if a shuttle passes in sufficiently close proximity to buildings, reception in the shuttle may be disrupted by forcing disconnections or channel switches because of the presence of wireless microphones in the buildings.

LSA with Adjacent Channels. The FCC's ruling mandates different maximum power levels for base stations, depending on whether adjacent channels are free or not. In effect, this divides the set of available channels into two categories: normal channels with lower maximum power; and the few deluxe channels on which base stations can use higher transmit power. On one existing campus, there is only one such deluxe channel. The existence of normal and deluxe channel further aggravates the LSA problem for AOOC protocols. Not only do these protocols have few channels on which all clients can transmit, but they will find even fewer deluxe channels.

Summary. Analysis of white space networks that employ an AOOC protocol shows that such networks are inherently inefficient in urban environments with many indoor microphones. One implications is that protocols in which all nodes operate on the same channel (for carrier sense, contention mechanisms) are not efficient in on-campus white space networks.

Multi-Channel Solution. AOOC protocols are relatively simple, because they follow the well-known Wi-Fi principle. Having every client on the same channel allows the use of efficient MAC-layer protocols, including contention resolution mechanisms (adaptive TDMA-type protocols, RTS-CTS handshakes, and the like). On the other hand, it has been shown that, in the face of LSA, there is a significant inherent cost associated to using such protocols. The more wireless microphones, the more frequently LSA will occur, and the more inefficient such protocols become.

Exemplary embodiments of the subject innovation relate to a white space networking protocol in which base stations use multiple channels to serve their clients, and switch between the channels appropriately. In one exemplary embodiment, a time division multiple access (TDMA)-based approach in which the base station 102 assigns time-slots to clients for upload traffic of clients that are grouped to communicate on a single channel. Download traffic can also use TDMA, or can be based on orthogonal frequency division multiple access (OFDMA). Different clients can transmit (during their time-slot) in different white space TV channels. The base station knows which client transmits in each time-slot, and on which channel, and can switch its radio frequency between subsequent time-slots accordingly.

Client-Driven Algorithm. One potential algorithm for assigning client devices to channels is referred to herein as a client-driven algorithm. In a client-driven algorithm, each client selects its own communication channel. Clients would presumably select the available channel with the most favorable transmission characteristics (for example, the channel with least noise) that is available both at the client location and the base station. Because every client using a client-driven algorithm can freely choose a channel on which to transmit, the base station simply switches accordingly.

A potential problem with an entirely client-drive algorithm is that in many practical cases, such a scenario may be neither possible nor desirable. The reason is the hardware-induced switching overhead at the base station. Note that this overhead is usually not significant in other frequency division multiple access (FDMA) protocols (including OFDMA) that switch frequencies within the same wider channel of up to a few MHz. Here, it may be useful to switch across different TV channels (each of which is 6 MHz wide), which might be anywhere between 512 MHz to 698 MHz, it is likely difficult to avoid the switching overhead.

The consequence of switching overhead is that it is not practical in terms of network throughput to let every client be on its own different channel. Desirably, many mobile clients may be bundled together on the same channel, so that the overhead for switching is amortized across all these mobile clients. On the other hand, forcing mobile clients onto one channels is problematic and inefficient because of the LSA problem. Hence, there is a trade-off between using many channels and letting client pick among them on the one hand, and using few channels, thus forcing the clients together on fewer channels. One advantage of using many channels and switching between them is that more opportunities are available to take advantage of channel diversity. Another advantage is fewer problems with LSA-situations (for example, disconnections are less likely). Further, a disadvantage of a client-driven approach is that it may be difficult to implement adaptive TDMA schemes if many clients are on different channels. That is, the efficiency of using per-channel adaptive TDMA schemes is reduced. Another disadvantage is that the channel switching overhead increases, which negatively effects overall throughput. Exemplary embodiments of the subject innovation attempt to provide an algorithm that achieves a good balance between these opposing goals.

Client Allocation Algorithm. The following discussion relates to an algorithm for allocating mobile client devices to channels in a white space network in accordance with the subject innovation. According to an exemplary embodiment of the subject innovation, it is not desirable for all clients to be on the same channel. In addition, the base station may desirably switch between channels as rarely as possible. An exemplary algorithm attempts to find an optimum spot in the trade-off between allowing a mobile client device to choose separate channels and forcing all devices to communicate on the same channel. Moreover, an exemplary client allocation algorithm is flexible in the number of channels it uses, and yet achieves provably efficient performance. In particular, an algorithm according to the subject innovation can adapt to LSA situations, even if many of the mobile clients of the base station 102 are located in close proximity to different wireless microphones.

Figure 2:
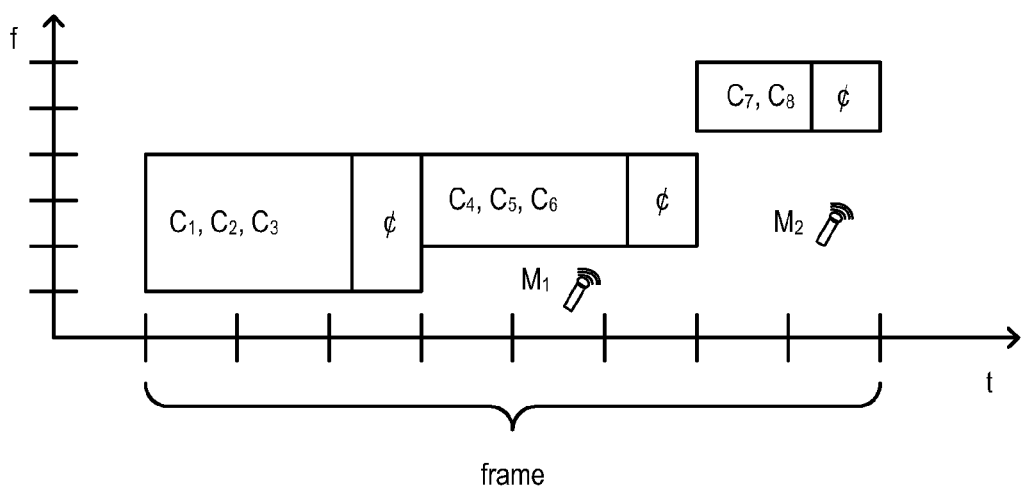
FIG. 2 is a graph that is useful in explaining the operation of a channel-selecting algorithm in accordance with the subject innovation.

FIG. 2 is a graph 200 that is useful in explaining the operation of a channel-selecting algorithm in accordance with the subject innovation. The graph 200 shows the assignment of channels by a base station to eight mobile clients $\{C_1, \ldots, C_8\}$. Channels are shown on the y-axis and time slots are shown on the x-axis. Channel 4 is blocked off for all devices by the presence of a primary user (i.e., an primary user such as a TV station). Two microphones $M_1$ and $M_2$ are located such that they prevent clients $\{C_4, C_5, C_6\}$ from using channel 1, and clients $\{C_7, C_8\}$ from using channel 3. The assignment of channels shown in FIG. 2 is optimal, assuming that channel 5 has the highest channel quality for clients $\{C_7, C_8\}$.

An exemplary embodiment of the subject innovation employs a TDMA-based scheme in which every mobile client transmits during its time-slot. Not every mobile client may transmit on the same channel (i.e., the base station switches between channels), but all clients that do transmit on the same channel are served consecutively during defined time slots within a communication frame. This reduces the number of times the base station needs to switch the channel, and thus reduces the switching overhead. The key algorithmic problem thus is to decide, within a communication frame, which client transmits on which channel. To solve this problem, a client algorithm according to the subject innovation may be employed to select a few cost-efficient channels on which all clients are served well. Since, as shown herein, embracing adaptive channel width is useful in maximizing throughput, the client allocation algorithm may be allowed to use channels spanning multiple TV-channels. One exemplary channel selection and assignment algorithm is shown in Table 1:

TABLE 1

Exemplary Channel Selection Algorithm used by a Base Station

1. Set of unassigned clients Q, initially Q:=V
2. Set of selected channels R, initially R:={ }
3. while |Q|> 0 do
4.    for every channel D do
5.       if D ∈ R then
6.          find W*⊆Q∩V(D) that maximizes $S_{W}*(D)$ according to Eq. (2).
7.       else
8.          find W*⊆Q∩V(D) that maximizes $S_{W}*(D)$ according to Eq. (1).
9.       end if
10.    end for
11.    from among all channels, pick channel D* and corresponding W* that maximize $S_{W}*(D*)$.
12.       assign all clients $v_i \in$ W* to channel D*.
13.       R:=R∪{D*}; Q:=Q\{W*}.
14. end while In each round of the client allocation algorithm shown in Table 1, the algorithm picks the channel with maximum spectrum efficiency per client. The spectrum efficiency $S_i(D)$ of a client $v_i$ on channel D is a measure that captures its expected throughput when using channel D. This measure depends on the channel quality of D, as well as on the channel switching overhead, and the number of other clients that are also assigned to channel D. Intuitively, the more clients use a common channel D, the more the channel switching cost is amortized per client.

For purposes of illustration, let V={$v_1, \ldots v_n$}, a set of clients associated to the base station. Let C denote the set of TV-channels at the base station, and let D be the set of contiguous subsets of such channels. For example, if TV-channels 21, 22, 23, and 26 are free, then the set D would be channels [21],[22],[23],[26],[21-22],[22-23],[21-23]. An exemplary embodiment supports adaptive channel width and static channel width. In an exemplary embodiment that supports static channels of fixed widths, the set D would be the same as the set C. The remainder of the algorithm would be unchanged. For any channel D∈D, V(D) is the set of clients that can use this channel for transmission to the base station (i.e., in an LSA situation, a client is no longer in V(D)). Finally, let $q_i(D)$ be a channel quality, a measure that captures the expected throughput per Hz if client $v_i$ uses channel D for connecting to the base station. In practice, the value $q_i(D)$ for channels D that span multiple TV-channels can be computed in various ways based on channel quality estimations for these individual TV channels $q_i(C)$. A simple, but reasonably accurate way is to determine the quality $q_i(D)$ as the minimum channel quality of any sub-channel, i.e., $q_i(D)=min_{C \in D} q_i(C)$.

In each iteration of the algorithm, it is desired to pick some channel, and assign clients to it. Specifically, it is desirable to find the channel and clients that have the highest per-client spectrum efficiency, i.e., that optimize the use of spectrum per-client. Let W ⊆ V (D) be a set of clients that use some channel D. The per-client spectrum efficiency $S_W$(D) is the effective expected throughput the clients achieve when using this channel.

Hence, $S_W$(D) may be defined as $$S_W(D) = CW(D) \cdot \frac{1}{|W|} \sum_{v_i \in W} q_i(D) \cdot \frac{|W| - \Delta}{|W|}, \quad \text{Equation (1)}$$

where CW(D) is the channel width of D (i.e., the number of TV-channels constituting D), and $\Delta$ is the channel switching time, expressed as a fraction of a slot time in the frame.

The first two terms essentially express how much total throughput the clients transmitting on this channel have. The last term in Equation (1) is to take account of the fact that after serving clients W on channel D, the base station needs to switch to another channel. A potential exception is a case in which all clients can be served on a single channel, which is a corner case that can easily be handled separately by the algorithm by checking the efficiency of each channel assuming all clients are associated to it. Hence, the per-client spectrum efficiency of the selected channel may be reduced by the fraction of time spent for switching:

$(|W|-\Delta)/|W|$.

The algorithm now proceeds in steps. In each step, it greedily picks the channel and a set of clients and associates these clients to this channel. Once a client is thus "served", it is no longer considered in subsequent iterations of the algorithm. The goal in each step is to pick the channel and un-served client-subset that maximizes the per-client spectrum efficiency (See Line 11 of Table 1).

The algorithm may possibly pick the same channel multiple times (with different clients). Clearly, the base station can serve all these clients in succession, without having to switch between them, thus eliminating one channel switch. Hence, it is desirable to discount the channel switching overhead from any channel that has already been selected when computing the channel's per-client spectrum efficiency. Equation 1 is desirably adjusted appropriately for such channels. Specifically, if D is already selected, then:

$$S_W(D) = CW(D) \cdot \frac{1}{|W|} \sum_{v_i \in W} q_i(D),$$ Equation (2)

Discounting channel switching overhead has the consequence that the once the algorithm has decided to serve at least some of its clients on a channel, it becomes cheaper to add additional clients to this existing channel, which has the effect of amortizing switching cost. The algorithm thus has a natural tendency of clustering clients onto channels (unless, of course, this is not possible due to LSA, or the channel diversity is so large that starting a new channel becomes more spectrum efficient).

For each channel, the algorithm finds the most spectrum efficient subset of clients W* from among all clients that can transmit on this channel V(D), and that are not yet served (see Lines 6,8 of Table 1). In spite of there being exponentially many such sets $W=2^V$, the optimal subset can be found easily in polynomial time by considering the clients one-by-one according to their channel qualities $q_i(D)$. The exemplary algorithm serves all clients, as long as each client has at least one TV channel in common with the base station.

A goal of the algorithm is to optimize the total throughput, by taking into account LSA situations, channel qualities, and channel switching overheads. The algorithm can be theoretically analyzed. Specifically, the following theorem may be shown to be applicable, which shows that the algorithm manages to achieve close to optimal aggregate throughput even in worst-case scenarios.

Theorem 1: Let aggregate throughput achieved within each frame by the exemplary algorithm is within a factor of 1−1/e of the optimum channel assignment.

The proof is based on an approximation-preserving reduction to the k-hitting set problem. In practice, the algorithm performs more effectively than the theoretical worst-case bound, as shown herein.

Generalization to Multi Base Station case. As set forth below, an exemplary embodiment (both the client-driven, and the exemplary client allocation algorithm) may be adapted to continue working efficiently if there are multiple, possibly interfering and overlapping base stations. It turns out that both the client-driven and client allocation algorithms of channel assignment can with minor modification be used in scenarios with multiple base stations.

Mitigating Interference. A potential problem in multiple base station scenarios is that neighboring base stations (and clients associated to them) can interfere with each other. It is possible to formulate the ensuring multiple base station interference minimization problem as a complex combinatorial optimization problem, that could be solved at some central server on-campus. This server could then decide, for each base station, which channels are used to serve which clients, as well as the timing of time-slots within each frame, to avoid interference. White this is possible, and could lead to efficient schedules, it is also a high-overhead solution that does seem appropriate for current on-campus deployment.

Instead, a game-theoretic approach may be chosen, in which each base station (along with its associated clients) locally seeks to optimize its own performance by avoiding channels of high-interference. Specifically, the single-base station algorithms may be adjusted in two ways.

Both algorithms tend to inherently disencourage base station/clients from selecting channels that are in use by other channels. The channel quality $q_i(D)$ (which is a measure capturing the expected throughput when using this channel) will decrease if other base stations or clients transmit on this channel. In an exemplary embodiment, this behavior is supported by reducing the values $q_i(D)$ for any channel D on which packets were dropped due to collisions. This leads to neighboring base stations to avoid overlapping channels and yields improved load-balancing. In cases where overlap is unavoidable, the base stations may desirably at least not assign overlapping time-slots within the same frame (base stations may be synchronized to frame-boundaries) in order to minimize interference. This can be achieved to a large extent by having different channel-orderings at overlapping base-stations, which ensures that these base-stations serve their channels in a different order. This approach helps minimizes packet collisions.

Exemplary embodiments of the subject innovation address a classic symmetry breaking problem in which two base stations find each other using the same channels, then switch to another channel only to find themselves interfering with each other again. In particular, an exemplary embodiment time-shifts the decision points for each base station such that no two neighboring base stations take decisions as the same time. In an exemplary embodiment, a mobile client may associate to the base station with highest RSSI value.

Experimental Results. In the process of obtaining experimental data for an exemplary embodiment of the subject innovation, a white space geo-database has been implemented, as recommended by the FCC. The geo-database employs terrain data from NASA's website and location of TV towers from the FCC database. The geo-database employs Longley-Rice propagation modeling to determine the white spaces available at a given location. This database has been used to determine the white spaces available in a campus implementation.

One exemplary embodiment employs a three node network using the radios described herein. One radio is setup as a base station on a rooftop of a building on the campus. Another radio is employed as a mobile client in a shuttle bus that circulates around the campus along a regular route. The third radio is deployed as a nomadic mobile client, which is moved to different parts of the campus.

A PC, which may control the white space radios deployed as mobile clients, periodically communicates location of the client to the base station, which then queries the geo-location database for the available channels. For sensing, a USRP based scanner that can sense at the low thresholds imposed by the FCC may be used. In addition, wireless microphone operators also have a web API to update the geo-location database in the event that they encounter interference from the white space network.

In one exemplary embodiment, a PC that operates the white space radio in the shuttle may operate the radio as a Wi-Fi access point. This allows users to benefit by having access the Internet for free over the white space spectrum.

The base station in an experimental network transmits at 4 W EIRP. The mobile clients use transmit power control, and use a maximum of 100 mW EIRP. Using BPSK modulation at the base station and mobile clients, and using the above settings, the base station was able to be pinged from all points in the shuttle over VHF. Over UHF, the coverage was more limited, with a resultant convex hull of coverage.

In order to provide continuous coverage inside the shuttle when it is mobile, VHF white spaces have been used. This is in part because VHF wireless microphones are unpopular, with the result that a VHF TV channel is unlikely to encounter LSA. In addition, VHF has good propagation characteristics. Moreover, an exemplary embodiment may be configured to assign client devices to VHF channels when the client devices are mobile (e.g., moving on a shuttle). It may be desirable, however, to switch to UHF channels when the shuttle is not moving because there are 30 available UHF channels compared to only seven VHF channels.

Channel Assignment Algorithm Implementation. An exemplary white space network has implemented the exemplary client allocation algorithm described herein. This implementation takes into account that the WiMax protocol does not support frames spanning multiple non-contiguous channels. Thus, the implementation allows multiple clients on different channels to be served by the same base station. Existing radios have been modified to assign 200 ms timeslots in order to amortize the channel switching and corresponding association overhead. When switching the time slot, a switch to a different frequency channel may be made, if needed. In addition, the frame may be modified to serve a new set of clients.

Figure 3:
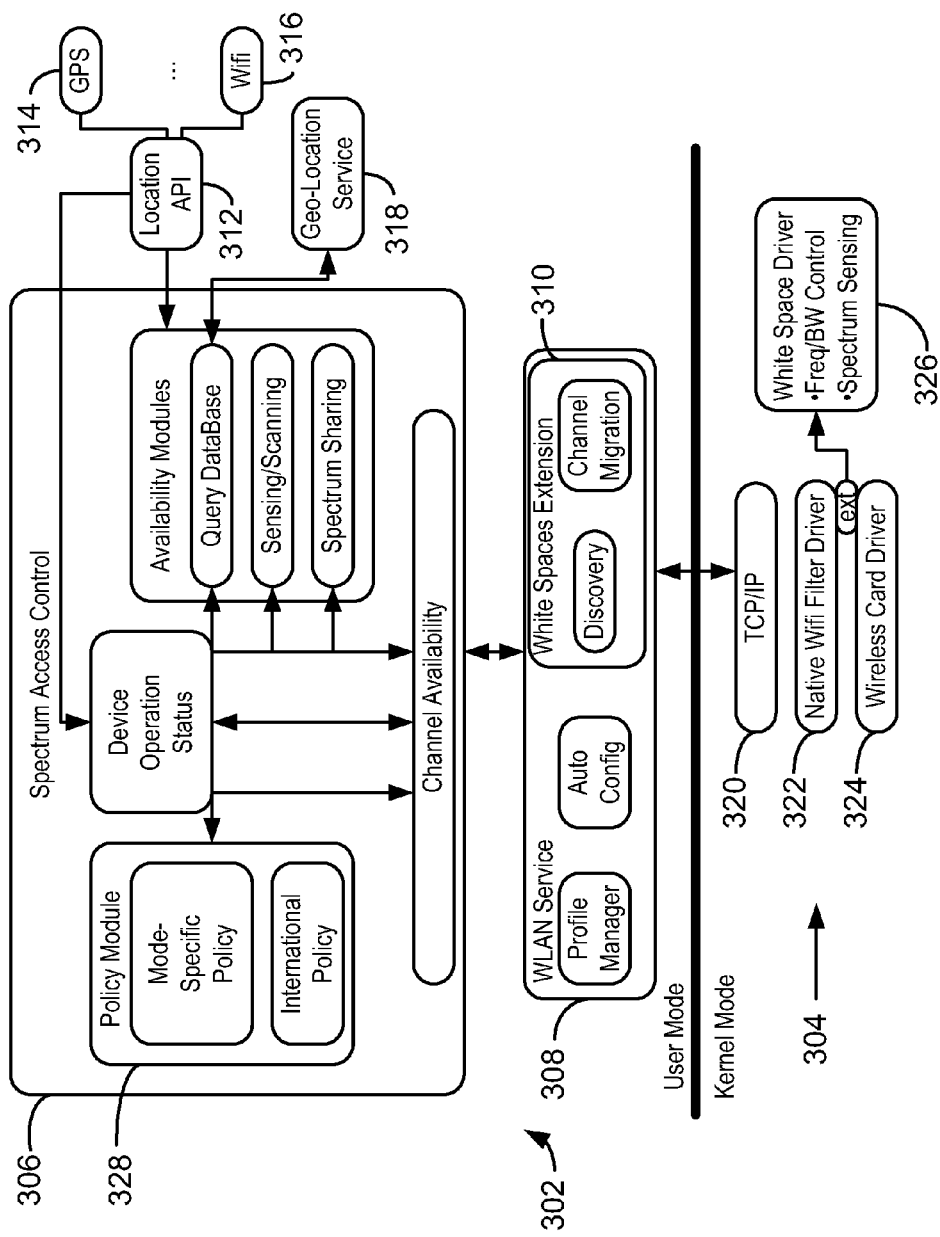
FIG. 3 is a block diagram of a networking stack that is configured to perform white space networking according to the subject innovation.

FIG. 3 is a block diagram of a network stack 300 that is configured to perform white space networking according to the subject innovation. The network stack 300 represents a modified Windows® network stack that may be employed on base stations and mobile clients to support white spaces. The network stack 300 comprises a user mode space 302 and a kernel mode space 304. Most components reside in the user mode space 302, while modifications in the kernel mode space 304 provide support for different bandwidths, and switch frequencies in the presence of primary users.

Unlike Wi-Fi and other wireless protocols that expose an Ethernet-like interface to the upper layers, FCC regulations regarding white space radios provide for a determination of spectrum availability. This determination may be made by communicating with a geo-location service over IP as well as sensing from the radio. This functionality is supported in the network stack 300.

In the exemplary embodiment shown in FIG. 3, the user mode space 302 comprises a spectrum access control module 306. The spectrum access control module 306 is a user level service that determines the white spaces that can be used by the device. It does so by (i) communicating with a geo-location service modules 318 (for which it needs location), (ii) sensing the spectrum for TVs and wireless microphones, or (iii) using spectrum reports from nearby nodes. In addition, the spectrum that can be used depends on the policy of the country or the region. This may be accounted for by a policy module 328 of the spectrum access control module 306. The main API exposed by the spectrum access control module 306 is the set of channels that can be used by the device.

The spectrum access control module 306 interfaces with a WLAN service module 308, which includes a white space extension module 310. The WLAN service module 308 manages the associations of a wireless networking card, which may provide access to Wi-Fi networks. The white space extension module 310 enhances the service provided by the WLAN service module 308 to make transitions to a white space network when a Wi-Fi network is unavailable. The WLAN service module 308 is also responsible for switching to a different part of the spectrum if the spectrum access control module 306 signals that its current channel is unusable.

The spectrum access control module 306 receives positioning data from a location API 312. The location API 312 may receive positioning information from a wide range of sources, including a GPS module 314 and/or a Wi-Fi module 316. The spectrum access control module 306 also receives data from a geo-location service module 318.

The kernel mode space 304 comprises a TCP/IP module 320, a native Wi-Fi filter driver 322 and a wireless card driver 324. A white space driver 326 may be implemented to provide frequency and bandwidth control. In addition, packets may be buffered when switching across networks and channels. The white space driver 326 may also provide spectrum sensing.

Evaluation of Experimental and Simulation Data. In addition to obtaining experimental data regarding an implementation of the subject innovation, simulations have been performed regarding an exemplary channel assignment algorithm. The following discussion relates to evaluating data obtained from the experimental network implementation as well as data obtained by simulation.

The performance of a channel assignment algorithm according to the subject innovation may be evaluated with respect to a single-base station network and a multi-base station network. The single base station evaluations are intended for micro-benchmarks that show how various algorithms react to changes in different system parameters. For the multi base station case, a known campus environment is modeled.

Setup. White space extensions to QualNet have been implemented. In particular, modeled aspects include availability and non-availability of TV channels, fragmentation, adaptive channel width, and the like. Wireless microphones have been modeled as Markov processes with a certain probability of being active or inactive. They are assumed to operate on a random TV-channel, which potentially reflects an actual campus environment. In the single-base station case, wireless microphones are located randomly in the plane. In the multi-base station case, microphones are placed at locations that correspond to actual buildings with conference rooms in a known campus.

Algorithms. In an implementation of the subject innovation, protocols used were TDMA-based (for both up- and downlink). Contention overhead is not modeled for AOOC-baseline protocols. This has the effect of improving the performance of AOOC-baseline protocols by making a comparison more conservative. Three frame allocation algorithms have been implemented: a generic AOOC protocol in which every mobile client is on the same channel as the base station, a client-driven algorithm, and the client allocation algorithm described herein. For the client-driven and client allocation algorithms, channel switching time is deducted from the time slot before the switch occurs. If during a frame, the base station serves multiple clients on the same channel, the slots of these clients are bundled to avoid unnecessary channel switches. Hence, the client-driven algorithm may not necessarily switch channels.

Parameters of Interest. The simulation setup naturally involves a large set of parameters that are relevant for the model behavior. Table 2 shows default values for these parameters (wherever possible based on an implementation or literature). Various parameters are varied relative to this default setting to evaluate the impact of different parameters on system performance. Unless otherwise stated, all such sensitivity analysis is conducted relative to the default configuration.

Spectrum availability (prior to wireless microphones) is based on an actual channel availability map for the implemented network. Microphones are known to be located in on-campus conference buildings. In a simulation, fifty microphones are distributed, and each microphone is turned on with a probability of 0.5.

The simulation models that, on average, about 25 microphones are on. It is likely that this is a conservative estimate. Anecdotal evidence has suggested that, at peak times during the day, as many as 50-60 microphones operate simultaneously. The default setting has a high average packet loss rate of 50% and relatively small channel diversity (std=0.5). This is a conscious choice for two reasons. First, the average is taken across all channels, and many channels may be very bad because of noise. Second, evaluation shows that high packet loss rates and relatively small channel diversity are a challenging scenario for the subject innovation relative to AOOC algorithms.

TABLE 2

Parameter settings in default configuration.
Default Subnet Configuration

| | |
|---|---|
| Number of clients per base station | 10 |
| Number of available TV channels | 9 |
| Average packet loss rate | 0.5 |
| Packet loss rate std | 0.5 |
| Slot duration | 10 ms |
| Channel switch time $\Delta$ | 3 ms |
| Coverage area | campus area (1 sq mi) |
| Microphone protection range (from Section 3.2) | 200 meters |
| Total number of Microphones | 25 on avg. |
| Microphone activation probability | 0.5 |

Simulation Results. When comparing the performance of various algorithms, results are normalized to a baseline representative of the performance of the AOOC algorithm. Data points are averaged over 50 simulation runs.

The following discussion relates to a study of the impact of various relevant parameters on the total system throughput. For each parameter, the cases of adaptive channel width and no adaptive channel width. In particular, simulate the case in which exemplary algorithms according to the subject innovation, as well as AOOC algorithms are restricted to using one TV channel (single channel); as well as the case when both the baseline AOOC and exemplary embodiments can use wider channels if available (adaptive channels). The first case discussed is the single channel case.

Impact of Channel Switching Time. To serve clients on different channels, base stations in exemplary multi-channel approaches according to the subject innovation (particularly the client-driven approach) spend extra time on channel switching. In contrast, no channel switching is needed for AOOC protocols. Hence, it is clear that as the channel switching time increases, AOOC will provide relatively higher performance than the client-driven approach. The exemplary client allocation algorithm would desirably behave like the client-driven approach for very small channel switching times, and then gradually start behaving more like AOOC as the switching overhead increases. That is, for any channel switching time, the client allocation algorithm desirably finds a sweet spot between the two extremes.

Observational evidence confirms that this expected behavior does occur. As channel switch time is varied from 1 ms to 10 ms (a full slot time), throughput of the AOOC algorithm remains constant, while the client-drive approach degrades linearly. The client allocation algorithm follows this degradation up to about 2 ms, but beyond this, it starts to more efficiently cluster clients on fewer channels, thus significantly outperforming both AOOC and client-driven. Even for very large channel switch times, the throughput of the client allocation algorithm is about 20% more than AOOC. This is because, even at such high switching overheads, the client allocation algorithm can sometimes avoid extreme forms of channel diversity, for example, by bundling two clients on a channel which otherwise would have had very bad channel quality on the base channel.

Impact of Channel Quality/Diversity. Channel quality is a measure that corresponds to the average packet loss rate, and hence, it is expected that the system throughput is essentially linear in the mean channel quality. With respect to channel diversity, as channel qualities become increasingly diverse (increasing standard deviation), it is expected that the multi-channel algorithms are more able to exploit this diversity as it can assign different channels to different clients. Thus, the higher the diversity, the more effectively these algorithms can amortize the channel switching overhead.

According to observational evidence, AOOC performance improves only marginally as channel quality diversity increases, as long as the mean stays the same. The reason is that these algorithms can only choose commonly available channels. Hence, relatively few channels are available. In contrast, the multi-channel algorithms significantly improve their performance with increased channel diversity. For example, while the total performance increase going from equal channels (std=0) to fully diverse channels (std=1) is only about 10% for AOOC, the client-driven and client allocation algorithms improve by 33% and 32%, respectively.

Impact of Microphones/LSA. The occurrence of LSA problems because of wireless microphones is a relevant distinguishing constraint in white space networks. In the absence of any wireless microphones, all three algorithms perform about equally, with a small difference stemming from the possibility of exploiting channel diversity. As the number of microphones increases, however, and LSA becomes frequent, the main difference between adaptive multi-channel algorithms and AOOC algorithms is dramatic. Whereas the multi-channel performance drops modestly (both client allocation and client-driven algorithms), the performance of AOOC protocols decreases dramatically even for a small number of microphones (for example, beyond 15 or 20 microphones). This is consistent with expectations. This implies that only multi-channel protocols are able to sustain the presence of microphones without significant degradation of system throughput.

Adaptive Channels. As explained herein, the possibility to bundle channels further favors multi-channel protocols over AOOC protocols. This is also shown by observations regarding the subject innovation. Adaptive-channel width plots corresponding to the single-channel plots previously described show qualitatively similar, yet qualitatively more extreme behavior. Compared to the single-channel case, performance degradation of the AOOC protocol is even more rapid. Whereas, in the single channel case, AOOC performs well up to about 10 microphones, its performance has already dropped by about 25% compared to the no-microphone scenario.

Multiple Base Stations. The results described to this point relate to single-base station networks. The following relates to the performance of the different algorithms in a multi-base station case. As mentioned, the base stations as well as the microphones are located on actual physical locations corresponding to the base stations in an actual implementation, as well as the conference rooms that have microphones. Clients are assumed to associate to the closest base station.

Observational evidence suggests that both multi-channel algorithms (i.e., client-driven and client allocation algorithms) perform more effectively than the AOOC-based approach, where all clients are on the same channel. If a single base station is used (for example, because of the size of a campus to be covered, there are likely to be no commonly available channels for the base station to use. Mobile clients will be forced to disconnect. As the base station density increases, however, the performance of AOOC-based protocols also improves. This is because of locality. With two or more base stations covering a given campus area, the average distance for each associated client reduces. Given that the number of microphones is constant, the likelihood of LSA reduces as well. Hence, more channels become available. It can be seen that the performance of the multi-channel solutions is improved (for example, two times the throughput for two base stations). As the number of base stations increases, the difference between multi-channel and AOOC diminishes. This is also expected because LSA reduces.

Testbed Validation. Two client nodes have been set up to communicate with the white space base station. Downstream iperf TCP sessions were initiated from the base station to the clients, and channel conditions were changed. QPSK with ¾ coding was used on a 1.75 MHz channel, and a custom scenario was evaluated to demonstrate two aspects of the implementation. Those two aspects are that the implementation works as expected and that channel switching cost is low.

A custom setup was performed using three TV channels—21, 22 and 26, which are all available in a particular campus environment. For client 1, channel 21 is initially available, channel 22 has a microphone, and channel 26 has poor quality. For client 2, channels 21 and 22 are available and 26 has poor quality. This covers many scenarios that are relevant to an evaluation of the subject innovation.

Initially, when channel 21 is available at both clients, the base station uses the same channel. After 25 seconds, a microphone was introduced on channel 21 for client 2, which caused the base station to switch across two channels—21 and 22. Again, after 50 seconds from the start, channel 21 was blocked at node 1 as well, in which case it needs to switch to channel 26 even though the quality of channel 26 is relatively bad. At 75 seconds, the microphone is removed from channel 21 for client 1. At 100 seconds, the initial conditions are again imposed. According to observational data, the implementation preforms as expected. Furthermore, the channel switching overhead, highlighted in the time between 25 and 50 seconds, is not very high.

Figure 4:
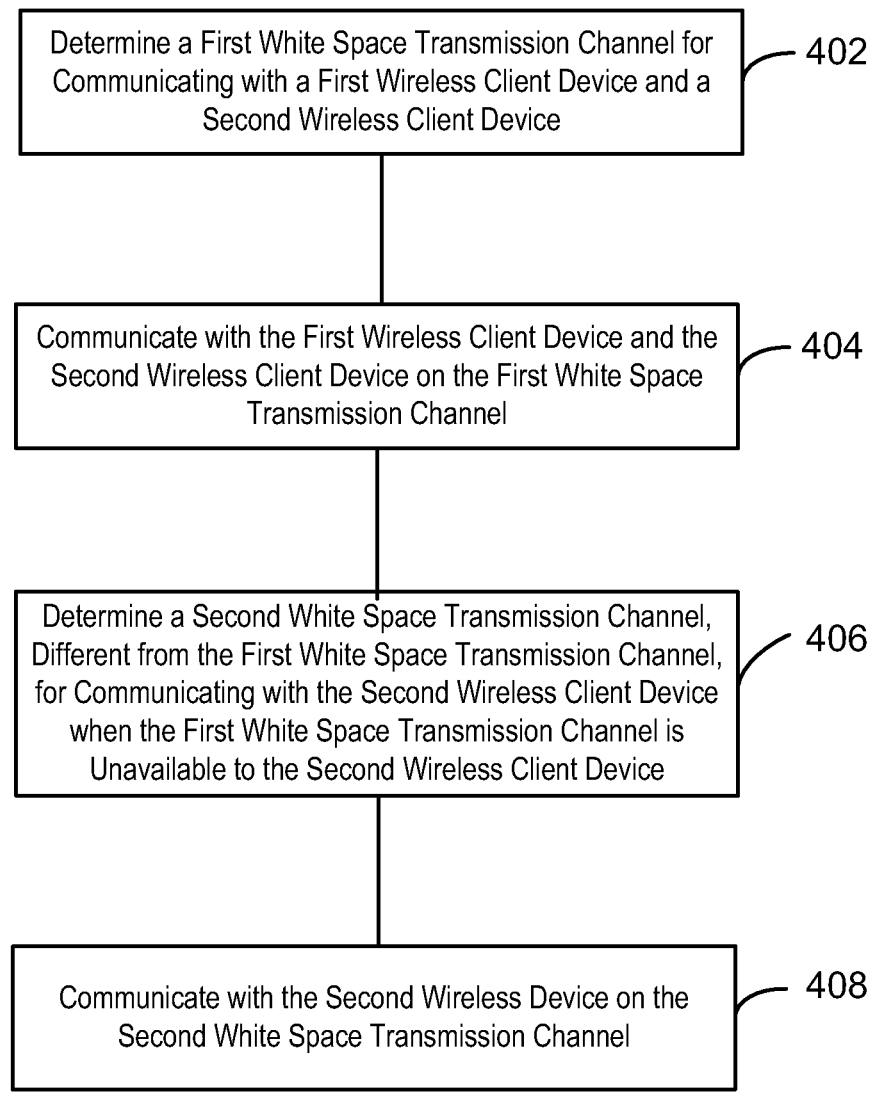
FIG. 4 is a process flow diagram of a computer-implemented method of transmitting data over a wireless network using white spaces, in accordance with the subject innovation.

FIG. 4 is a process flow diagram of a computer-implemented method 400 of transmitting data over a wireless network using white spaces. The method 400 provides for assigning channels for communication between one or more wireless base stations and mobile client devices in a white space network according to the subject innovation. At block 402, a first white space transmission channel for communicating with a first mobile client device and a second mobile client device is determined. Communication takes place with the first mobile client device and the second mobile client device on the first white space transmission channel, as shown at block 404.

The method 400 addresses LSA issues in white space networks. As shown at block 406, a second white space transmission channel, different from the first white space transmission channel, is determined for communicating with the second mobile client device when the first white space transmission channel is unavailable to the second mobile client device because of the presence of a primary user on the first white space transmission channel. Unavailability of the first white space channel may occur relative to the second mobile client device because of the presence of a primary user on the first white space transmission channel in the vicinity of the second mobile client device. For example, a wireless microphone may begin using the first white space transmission channel in the building where the second mobile client device is located. At block 408, communication takes place with the second wireless device on the second white space transmission channel at the same time that communication is taking place with the first mobile client device on the first white space transmission channel.

An exemplary embodiment of the subject innovation has resulted in measurements of a white space network while abiding by the power limitations set forth by the FCC. In addition, properties of white space networks that are desirably taken into account when designing standards or building networks over white spaces are described herein.

Exemplary embodiments of the subject innovation relate to providing outdoor coverage in a campus network. It has been shown through experimental data that the lower frequencies of white spaces have good propagation characteristics to cover the entire campus with very few base stations. However, the prevalent use of wireless microphones on campus pose a challenge. The coverage area of a wireless microphone is analyzed herein, and it has been noted that the shielding material commonly used in buildings significantly attenuates the signal of wireless microphones, thereby limiting the region that is affected by the microphone. This leads to a property of urban white space networks referred to herein as LSA, in which a channel is unavailable to a mobile client but not the base station. It is shown herein that protocols in which a base station communicates with all mobile clients on a single channel result in a significant performance degradation. An exemplary channel selection algorithm is proposed herein to address this problem. Performance of the exemplary algorithm is described with reference to a prototype deployment. Experimental results show that the exemplary algorithm provide significantly improved performance relative to protocols that operate on the commonly available channel.

Measurement Methodology. An exemplary implementation of the subject innovation employs a mobile shuttle bus with an attached a 25 to 1500 MHz VHF/UHF antenna. The antenna is connected to a radio in the shuttle using an RG-8 cable. A PC in connection with a white space radio may be used to measure signal strength as the shuttle moves throughout the campus. In one exemplary embodiment, the PC operates using a Windows® operating system such as Windows 7. The PC may be used to record measurements about network activity (signal strength, for example) and to geo-tag the activity data with a GPS reading.

A WiMax IEEE 802.16d chipset may be used to provide communication using a wireless networking protocol. Such a chipset may be capable of operating below 1 GHz. The specific frequencies of operation may be settable through a policy file. In one exemplary embodiment, the range of operation may be on the upper VHF and UHF white space frequencies, for example, 174 MHz to 216 MHz and 512 MHz to 698 MHz. The hardware may be configured to transmit at up to 10 W although this power level may be above the frequency permitted by an FCC experimental license.

In one exemplary embodiment, two base station nodes were deployed for measurements in a campus that spans 1 mile by 0.75 miles. A 25-1500 MHz discone antenna with a 2 dBi gain was placed on the rooftop of a 4-storeyed building.

A 100 foot RG-8 cable was used to connect the antenna to a radio, which was placed in a server room on the second floor of the building. The RF cable added a 2 dB attenuation which was offset by the gain of the antenna.

A campus shuttle was modified to operate over white spaces. The radio was connected to the shuttle battery, and the system was tested with two different antennae attached to a hitch of the shuttle. The performance of the smaller antenna was good in the UHF spectrum, while the larger antenna performed well in the UHF and VHF bands. A frequency of 518 MHz was used to test the white space coverage, and a frequency of 177 MHz was used to test coverage over VHF frequencies. Both corresponding TV channels were available the campus location.

In an exemplary embodiment, each radio is controlled using a PC, which was also attached a GPS unit. For example, the GlobalSat's BU-353 GPS is based on the SiRF Start III chipset and its location accuracy is within three meters 95% of the time. The PC may be used to record the GPS location at regular intervals, for example, once every second. In an exemplary route that takes 45 minutes to an hour to cover in the shuttle, about 2,500 to 3,000 data points may be recorded for every configuration (one reading per second).

An exemplary system has been operated under an experimental license from the FCC, which permitted operation on all the white spaces within a campus environment. This license allows transmission at 4 W EIRP from fixed nodes, and 100 mW EIRP from mobile nodes. The license also permits transmission from mobile nodes in the UHF frequency band (512 MHz to 698 MHz) and the VHF frequency band (174 MHz to 216 MHz).

Coverage Holes with Existing Wi-Fi Deployments. As explained herein, existing Wi-Fi deployments have relatively limited coverage outdoors. An exemplary embodiment has been used to quantify coverage by driving around various shuttle routes on an existing campus while slowing down near buildings. A laptop PC with an Atheros chipset was driven around in a car. With an external antenna, and measured a received signal strength indicator (RSSI) of beacons from the Wi-Fi Access Points on the campus. The Wi-Fi card was scanning all 11 2.4 GHz Wi-Fi channels, with a dwell time of 130 ms. The recorded results have been divided into 2-second intervals. For every interval, the maximum received RSSI beacon was recorded, and a cumulative distribution function (CDF) was plotted across all time slots. For ease of exposition, a graph showing the results may employ an X-axis to represent the absolute value of the RSSI. The noise floor for the Wi-Fi chipset that was used is −95 dBm. Results showed that more than 60% of the time, the laptop PC did not have Wi-Fi coverage. Even when there was coverage, (e.g., in close proximity to campus buildings), the RSSI was extremely low.

Another experiment attempted to improve outdoor Wi-Fi coverage in vehicles by placing more than one (up to four) Wi-Fi Access Point in every campus building. However, the higher frequencies (2.4 GHz) of Wi-Fi had very poor propagation characteristics and led to several coverage holes. Also, large parts of the campus (between buildings, etc) were not covered at all.

Conclusion. What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc. which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-implemented method for transmitting data over a wireless network using white spaces, the method comprising:
   determining one or more white space transmission channels for communicating with a plurality of mobile client devices, based on a quality of the white space transmission channels, a channel switching overhead associated with serving the mobile client devices on the white space transmission channels, and whether the mobile client devices are moving on a vehicle; and communicating with the mobile client devices via a first white space transmission channel or a second white space transmission channel, the first white space transmission channel being a very high frequency (VHF) channel used to transmit data when the mobile client devices are in motion on the vehicle, the second white space transmission channel being an ultra-high frequency (UHF) channel used to transmit data when the mobile client devices are not in motion on the vehicle.

2. The computer-implemented method recited in claim 1, wherein the channel switching overhead is discounted if another mobile client device is currently served on the white space transmission channel that is transmitting data.

3. The computer-implemented method recited in claim 1, wherein the white space transmission channels are determined based on an LSA situation.

4. The computer-implemented method recited in claim 1, wherein communication with the mobile client devices takes place during a specific time slot of a communication frame.

5. The computer-implemented method recited in claim 4, wherein the specific time slot is identified using a time division multiple access (TDMA) protocol.

6. A computer-implemented method for transmitting data over a wireless network using white spaces, the method comprising:

determining one or more white space transmission channels for communicating with a plurality of mobile client devices, based on a quality of the white space transmission channels, a channel switching overhead associated with serving the mobile client devices on the white space transmission channels, and whether the mobile client devices are moving on a vehicle; and communicating with a first mobile client device and a second mobile client device on different channels of the white space transmission channels, a first white space transmission channel being a very high frequency (VHF) channel when the first mobile client device is in motion on the vehicle, the first white space transmission channel being an ultra-high frequency (UHF) channel when the first mobile client device is not in motion on the vehicle.

7. The computer-implemented method recited in claim 1, comprising selecting a width of one of the white space transmission channels, the width spanning multiple television channels.

8. The computer-implemented method recited in claim 1, comprising selecting the white space transmission channels based in part on data received from a geo-location service.

9. The computer-implemented method recited in claim 1, comprising selecting the white space transmission channels in part based on a maximum spectrum efficiency for the mobile client devices.

10. A wireless base station that transmits and receives data using white spaces, the wireless base station comprising a computer processor, the computer processor configured to communicate with mobile client devices over white space communication channels, a first white space transmission channel being a very high frequency (VHF) channel when the mobile client devices are in motion on vehicles, and a second white space transmission channel being an ultra-high frequency (UHF) channel when the mobile client devices are not in motion on the vehicles, the white space communication channels being selected by the wireless base station based on:

whether the mobile client devices are moving on vehicles;
a quality of the white space communication channels; and
a channel switching overhead associated with serving the mobile client device on the white space communication channels.

11. A mobile client device comprising a computer processor, the mobile client device configured to transmit and receive data using white spaces, the mobile client device communicating with a wireless base station over a first white space communication channel when the first white space communication channel is not being used by a primary user and communicating with the wireless base station over a second white space communication channel when the first white space communication channel is being used by the primary user, the first white space transmission channel or the second white space transmission channel being a very high frequency (VHF) channel when the mobile client device is in motion on the vehicle, the first white space transmission channel or the second white space channel being an ultra-high frequency (UHF) channel when the mobile client device is not in motion on the vehicle, the first white space communication channel and the second white space communication channel being selected by the mobile client device based on:

a quality of the white space transmission channels;
a channel switching overhead associated with serving the mobile client device on the white space transmission channels;
whether the mobile client device is moving on a vehicle; and
whether the mobile client device is in a local spectrum asymmetry (LSA) situation with a local wireless device.

12. The mobile client device recited in claim 11, wherein the primary user does not interfere with communication on the first white space communication channel by a second mobile client device located out of range of the primary user.

13. The mobile client device recited in claim 11, wherein the local wireless device comprises a wireless microphone.

14. The mobile client device recited in claim 11, being served by the wireless base station on a same white space communication channel with another mobile client device communication with the wireless base station taking place during consecutive time slots of a same communication frame.

15. The mobile client device recited in claim 11, wherein a width of the first white space communication channel is selected on an adaptive basis, the first white space communication channel comprising multiple television channels.

16. The wireless base station recited in claim 10, the channel switching overhead being discounted if another mobile client device is currently served on a specific white space communication channel.

17. The wireless base station recited in claim 10, a width of each of the white space communication channels being selected on an adaptive basis, and wherein the width of the white space communication channels spans multiple television channels.

18. The wireless base station recited in claim 10, wherein all mobile client devices that are served on a same white space communication channel, are served consecutively, during defined time slots, within a communication frame.

19. The mobile client device recited in claim 11, wherein the mobile client device transmits the data according to a time division multiple access (TDMA) scheme.

* * * * *